(12) United States Patent
Niwa et al.

(10) Patent No.: US 7,380,775 B2
(45) Date of Patent: Jun. 3, 2008

(54) VIBRATION ISOLATOR AND ATTACHMENT METHOD THEREOF

(75) Inventors: Satoshi Niwa, Osaka (JP); Kazushi Nishiyama, Osaka (JP); Hiroyuki Masuda, Osaka (JP); Yasuhiro Teranishi, Osaka (JP)

(73) Assignee: Toyo Tire Rubber Co., Ltd., Osaka (JP)

( * ) Notice: Subject to any disclaimer, the term of this patent is extended or adjusted under 35 U.S.C. 154(b) by 324 days.

(21) Appl. No.: 10/541,921

(22) PCT Filed: Dec. 13, 2004

(86) PCT No.: PCT/JP2004/018596

§ 371 (c)(1),
(2), (4) Date: Jul. 12, 2005

(87) PCT Pub. No.: WO2006/064537

PCT Pub. Date: Jun. 22, 2006

(65) Prior Publication Data

US 2006/0125165 A1    Jun. 15, 2006

(51) Int. Cl.
*B60G 11/22* (2006.01)
(52) U.S. Cl. .................................. 267/293; 267/294
(58) Field of Classification Search ............... 267/293, 267/294, 124, 140.4, 140.5, 141.1, 141.2, 267/141.4, 141.5, 219, 270, 280–282
See application file for complete search history.

(56) References Cited

U.S. PATENT DOCUMENTS

| | | | |
|---|---|---|---|
| 2,733,108 A | * | 1/1956 | Cowles ..................... 384/582 |
| 3,034,838 A | * | 5/1962 | Abel ......................... 384/214 |
| 3,243,239 A | | 3/1966 | Hackman |
| 3,922,040 A | * | 11/1975 | Carter ....................... 384/209 |
| 6,893,034 B2 | * | 5/2005 | Fader .................. 280/124.166 |
| 2006/0091595 A1 | * | 5/2006 | Hayashi et al. ............. 267/276 |

FOREIGN PATENT DOCUMENTS

| | | | |
|---|---|---|---|
| CA | 2248823 A1 | * | 4/1999 |
| JP | 7229530 A | * | 8/1995 |
| JP | 10-38026 | | 2/1998 |
| JP | 2001-59545 | | 3/2001 |
| JP | 2001-271860 | | 10/2001 |
| JP | 2004-314672 | | 11/2004 |

* cited by examiner

*Primary Examiner*—Pam Rodriguez
(74) *Attorney, Agent, or Firm*—Westerman, Hattori, Daniels & Adrian, LLP.

(57) ABSTRACT

The invention is to permit a bushing main body of rubber elastomer to be adhered to a bar member while retaining a necessary contact pressure for adhering and after adhering, to permit a further compressive force to be imparted. The bushing main body (10) having a bore (11), through which the bar member (B) passes, and a bracket (20) holding the former are longitudinally split into two, respectively, the resulting split rubber bodies (10*a*)(10*b*) are vulcanization bonded to inner peripheral surfaces of the resulting half bracket members (20*a*)(20*b*). The inside diameter (D1) of both split rubber bodies as molded is made smaller than the outside diameter (D2) of the bar member, and inner peripheral surfaces (11*a*)(11*b*) at the bore are formed to be eccentric on mutually opposite sides. While pinching the bar member by both split rubber bodies, both half bracket members interposing a spacer (30) are locked together to compress the split rubber bodies thereby to adhere the peripheral surfaces at the bore to the outer peripheral surface of the bar member, and after the spacer is removed, both half members are locked so as to butt contact with each other thereby further compressing both split rubber bodies in mutually opposing directions.

12 Claims, 5 Drawing Sheets

VIBRATION ISOLATOR AND ATTACHMENT METHOD THEREOF

TECHNICAL FIELD

This invention relates to a vibration isolator assembly used as a stabilizer bushing, a rear suspension bushing or other various rubber bushings for automotive vehicles and its attachment method.

BACKGROUND ART

Rubber bushings, e.g., a stabilizer bushing, rear suspension bushing, etc. which are a kind of automotive vibration isolating device are generally formed of a rubber elastomer assuming a thick-walled cylinder shape and used in the state that a bar member such as a stabilizer bar for vehicles is inserted through its bore and held in place.

A vibration isolator assembly formed of such a rubber bushing comprises a thick-walled cylindrical bushing main body made of rubber elastomer having a bore through which a bar member such as a stabilizer bar passes, and a bracket holding the bushing main body from outwardly thereof. For example, the bracket consists of a pair of bracket members formed by splitting thereof into an attachment side to be attached to the vehicle body and a locking side to be locked to the former, and both bracket members are locked together in the state that the bar member is inserted through the bore of the bushing main body, thereby being attached fixedly to the bar member, with the bushing main body fastened. For purposes of mounting to the bar member such as a stabilizer bar, the bushing main body is formed partly with longitudinal cutouts so as to be capable of breaking open or longitudinally split into two.

With such a bushing main body as stated above that is fixed to the bar member by compressive force (friction force), however, because of non-adhesive bonding a problem existed in that for example, when used for an automotive stabilizer bar, a slipping between the bar member and the bushing main body occurs owing to swaying or torsional movement of the bar member caused by abrupt starting or stopping, or turning, etc. of a vehicle, as a result of which unusual noises such as a squeaking noise are generated.

In particular, also where the attachment state or fastening state to the car body or the bar member is devised so as to make the compression amount large to increase the friction force, as is the case with Patent References 1 and 2 listed below, because of non-adhesive anchoring, a strange noise due to the slipping was seldom, if ever generated in a low temperature situation or upon ingress of water and besides, a preventive effect against positional slippage (shifting) in the axial direction was not sufficient either, and there was a problem in the retention of vibration isolating characteristics.

In order to prevent the generation of strange sounds (noises) due to the slip, for example, a proposal has been also made to use a rubber material having a self-lubricating property for the bushing main body or to apply a woven fabric such as a cloth of Teflon™ to the bore part through which the bar member passes thereby to improve the sliding to the bar member (e.g., Patent References 3 and 4 listed below).

However, the problems with this case were that due to easy sliding between the bushing main body and the bar member, that approach is disadvantageous in the respect of the preventive effect to lateral sliding or detachment and consequently, it is necessary to conjointly use any preventive means against detachment and besides, because of good sliding, the steering stability is impaired.

Therefore as exemplified in Patent References 5 and 6, a proposal has been made to adhere the bushing main body made of rubber elastomer to the bar member, e.g., a stabilizer bar. With Patent Reference 5, however, a thermosetting resin is used to take advantage of a high temperature heating treatment at a coating step of the stabilizer bar, whereas in Patent Reference 6, an adhesive agent containing an additive capable of additional vulcanization by heating treatment is used. In either case, a heating treatment step is necessitated and additionally, the bushing main body itself made of rubber elastomer is heated upon adhering, as a result of which there is a danger of change in characteristics thereof.

In particular, in adhering in such a way as described above, it is necessary to ensure a contact pressure required for adhesion over the entire surface so as not to cause a problem of separation at the adhesive interface due to lack of the pressure upon adhering. Nevertheless if the rubber elastomer is adhered in an excessively compressed state, a high temperature heat of 160 to 180° C. will be generated at the adhered area, so that the problem arises that the characteristics of the rubber elastomer are changed, accelerating a degradation of rubber. Further, it is desired that in the state of use, the bushing main body can be maintained at its condition imparted with an adequate compressive force for the purposes of maintaining the adhesion state and enhancing the durability.

Patent Reference 1: JP Patent Application Publication 11(1999)-192828

Patent Reference 2: JP Patent Application Publication 2001-271860

Patent Reference 3: JP Patent Application Publication 2001-182767

Patent Reference 4: JP Patent Application Publication 2001-221284

Patent Reference 5: JP Patent Application Publication 2001-270315

Patent Reference 6: JP Patent Application Publication 2000-142068

DISCLOSURE OF THE INVENTION

Problems to be Solved by the Invention

The present invention has been made in view of the problems described above, and is designed to adhere a bushing main body made of rubber elastomer to a bar member, e.g., a stabilizer bar thereby preventing generation of strange sounds due to the slip and to improve on the steering stability by. More particularly, the invention will provide a vibration isolator and attachment method thereof that are capable of ensuring a predetermined contact pressure over the whole peripheral surface of a bore of the bushing main body thereby securing the adhesion and in the state of use, are capable of imparting a certain degree of compression amount to the bushing main body so as to elevate the durability.

Means of Solution of the Problems

This invention consists in the vibration isolator comprising a bushing main body in a cylindrical form made of rubber elastomer having a bore through which a bar member passes, and a bracket holding the bushing main body from an outer periphery thereof, the vibration isolator being adhered at the bore part to the bar member, which is characterized in that the bushing main body and the bracket are longitudinally split into two, respectively; one pair of resulting split rubber bodies jointly constituting the bushing main body are vulcanization bonded to inner peripheral surfaces of one pair of resulting half members of the bracket capable of locking; an inside diameter of the bore as molded at the split rubber bodies is made smaller than an outside diameter of the bar member, and semicircular peripheral surfaces around the bore of both split rubber bodies are formed to be eccentric on mutually opposite sides thereof; both split rubber bodies are compressed so as to enlarge respective inside diameters thereof by locking of both half bracket members while pinching the bar member by and between both split rubber bodies, and the peripheral surfaces around the bore are adhered to an outer peripheral surface of the bar member; and the both split rubber bodies are further compressed in mutually opposing directions by locking of the both half bracket members in mutually butt contacting state.

By that feature, when the bushing main body made of rubber elastomer is adhered to the bar member such as a stabilizer bar which is held in the bore of the bushing main body in an insertion state through it, it is possible to ensure a given fastening allowance over the whole peripheral surface of the bore by locking of both half bracket members, thus capable of generating a contact pressure required for the adhesion whereby a secure adhesion and anchoring of them is possible over the whole peripheral surface. Moreover in its state of use, the bushing main body is imparted with a predetermined compression, and hence the durability of the bushing main body can be enhanced.

In particular, since the peripheral surfaces around the bore of both split rubber bodies are formed to be eccentric on mutually opposite sides, the rubber thicknesses of both split rubber bodies in the mutually opposing directions are made larger and accordingly, the fastening allowance is made larger. Consequently by fastening and locking of the both half bracket members, the both split rubber bodies can be further compressed in the opposing directions, as a result of which it is possible to impart a greater compressive force, so that the adhesion condition is further stabilized and the durability of the bushing main body can also be enhanced.

In the vibration isolator described above, it is preferred that the inside diameter of the bore as molded at the both split rubber bodies be formed to be smaller than the outside diameter of the bar member at its maximum diameter part at least by a dimension corresponding to the fastening allowance required for ensuring the contact pressure upon adhesion. Thereby it is possible to ensure a contact pressure necessary for adhesion over the whole peripheral surface of the bore thereby performing a secure adhesion.

In the above-mentioned vibration isolator, it is preferred that the both split rubber bodies jointly constituting the bushing main body be formed so that their peripheral surfaces around the bore may be gradually smaller in diameter from an axially central part toward both ends of them. That is, if the peripheral surfaces around the bore are formed to be straight in the axial direction, then the contact pressure is lower toward both end sides of them, so that the expected compression effect will not be obtainable. However by constructing as mentioned above, the contact pressure upon adhesion can be held sufficiently also at axially both ends of both split rubber bodies and a given fastening force can be imparted, whereby the durability can be enhanced.

In another aspect, this invention consists in an attachment method of the vibration isolator constructed as described above by adhering it to the bar member, wherein in the state that the bar member is pinched through an adhesive layer by both split rubber bodies of the bushing main body, both half bracket members are locked together to adhere the peripheral surfaces around the bore of the split rubber bodies to the outer peripheral surface of the bar member, which method is characterized in that upon adhesion, a spacer is interposed between opposing surfaces of both the half bracket members to lock the half bracket members thereby compressing the split rubber bodies so as to enlarge the inside diameter of the bore thus adhering the peripheral surfaces around the bore to the outer peripheral surface of the bar member; and subsequently to the adhesion, the spacer is removed and both the half bracket members are locked so as to butt contact with each other, thereby compressing further both split rubber bodies in mutually opposing directions.

By this method, despite the fact that the semicircular bore portions of both the split rubber bodies jointly constituting the bushing main body are formed to be eccentric on the opposite sides relative to inner peripheries of the both half bracket members, because of fastening and locking of the both half bracket members, the peripheral surfaces around the bore of both split rubber bodies can be securely adhered while maintaining at a necessary contact pressure over the whole periphery thereof and besides, after this adhesion, by locking both half bracket members thoroughly, both the split rubber bodies can be further compressed, so that it is possible to impart reliably a preliminary compression in the state of use, without the necessity of excessively compressing upon adhesion.

In the above-mentioned attachment method, it is preferred that the split edge surfaces of both the split rubber bodies be slanted to project toward opposing sides more on the bore sides and made to butt contact with each other by locking of both half bracket members. Thereby in the adhesion state, the split edge surfaces of the split rubber bodies are fayed without clearance and rendered integral, thus enhancing the durability of the bushing main body.

Again in the aforesaid attachment method, it is preferred that the spacer have a thickness the same as or slightly smaller than the eccentricity amount of the peripheral surfaces around the bore of the split rubber bodies, and that in the state that both half bracket members are locked together, interposing the aforesaid spacer, the split edge surfaces on their bore sides of the split rubber bodies butt contact with each other. Thereby the peripheral surfaces around the bore of the both split rubber bodies can be securely adhered to the outer peripheral surface of the bar member by the locking of the both half bracket members interposing the spacer.

Effects of the Invention

According to this invention thus far described above, wherein the bushing main body made of rubber elastomer is adhered and anchored to the bar member such as a stabilizer bar, in particular, a secure adhesion is possible while ensuring the contact pressure required for the adhesion, there is no danger of separation, etc. at the adhesive interface due to lack of the contact pressure upon adhesion, and a slip or positional deviation in the state of use is not likely to occur. Thus the generation of strange sounds can be prevented and the steering stability can be satisfactorily maintained.

In particular, by constructing so that the vibration isolator is mounted on the bar member in a way as recited in claims 4 through 6, the bushing main body can be reliably adhered and secured to the bar member and a sufficient compression amount in opposing directions can be conferred to the split rubber bodies of the bushing main body, and hence it is possible to maintain the adhesion state further more satisfactorily and to enhance the durability.

BEST MODE FOR CARRYING OUT THE INVENTION

The embodiments of the invention will be hereinafter described with reference to examples shown in the accompanying drawings.

Figure 1:
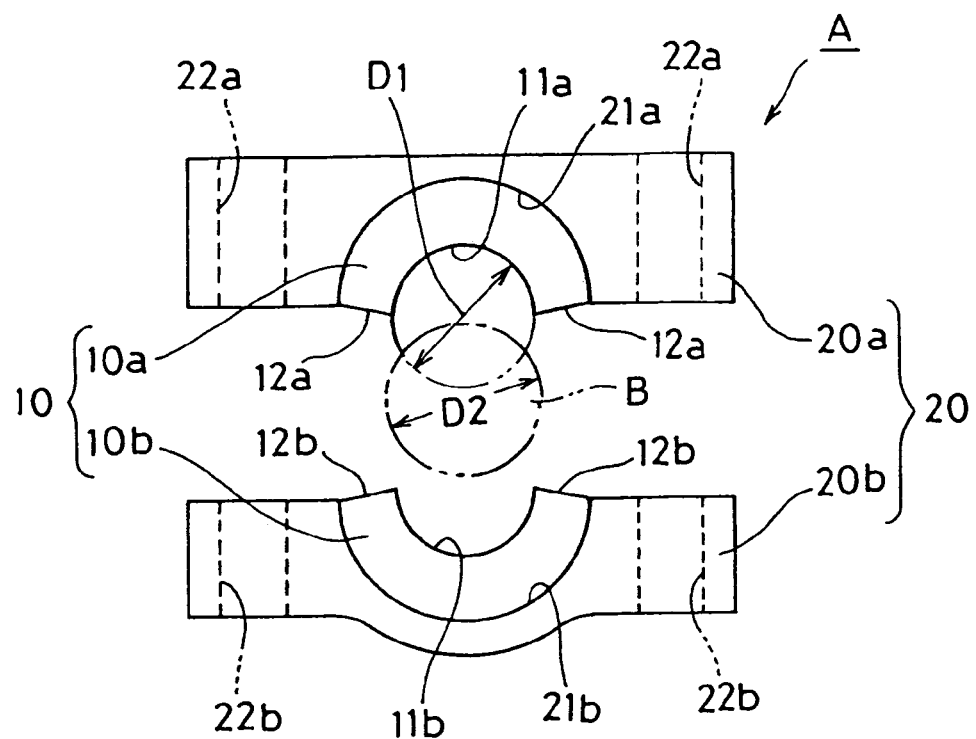
FIG. 1 is a front elevation of a vibration isolator in one example of this invention showing its separated state prior to attachment to a bar member.
Figure 2:
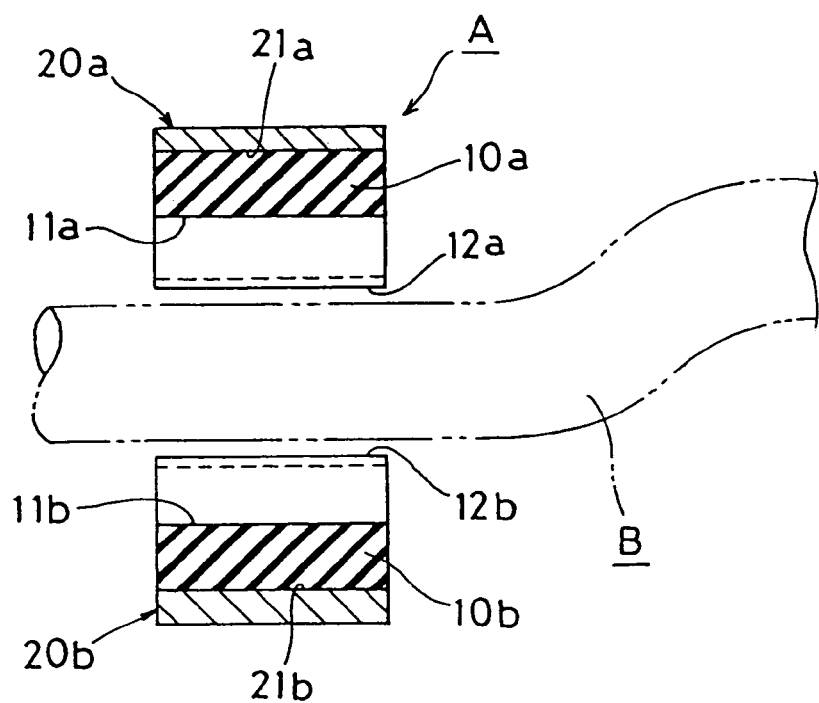
FIG. 2 is a longitudinal sectional view of FIG. 1.
Figure 3:
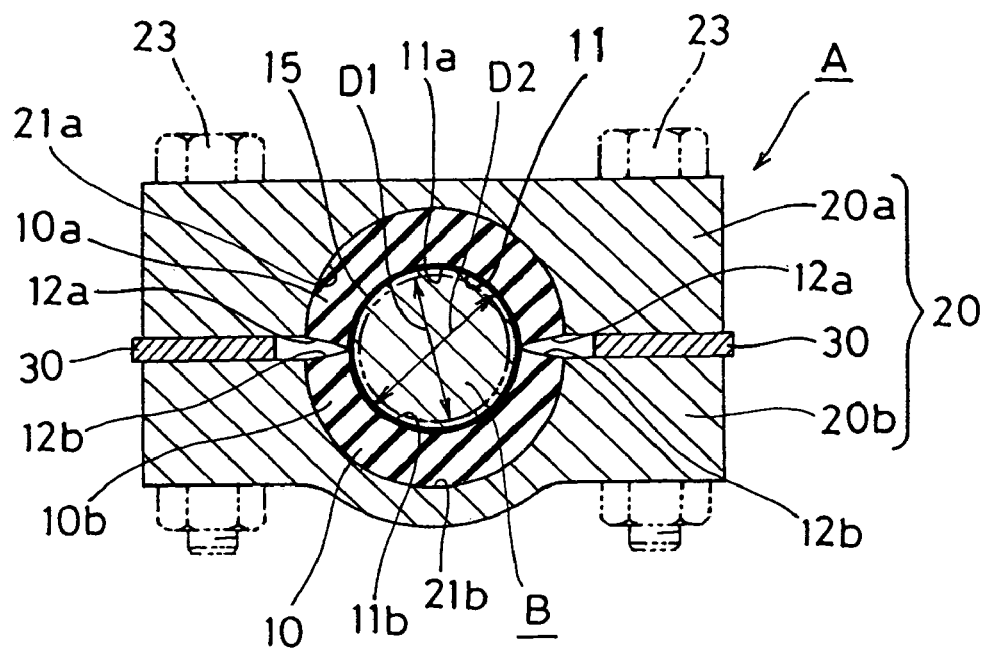
FIG. 3 is a cross-section of the vibration isolator above when adhered to the bar member.
Figure 4:
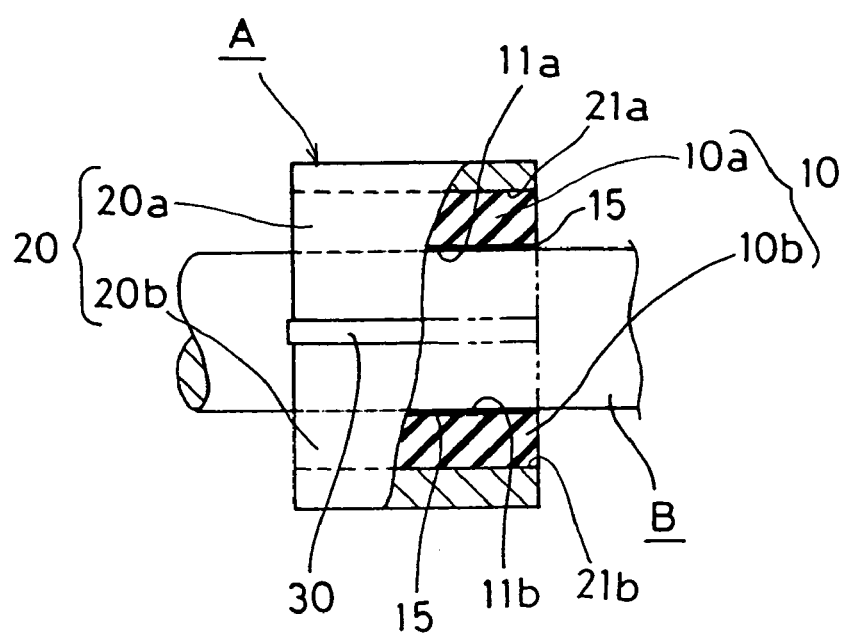
FIG. 4 is a side elevation, in partly cross-section, of the vibration isolator in the adhered state.
Figure 5:
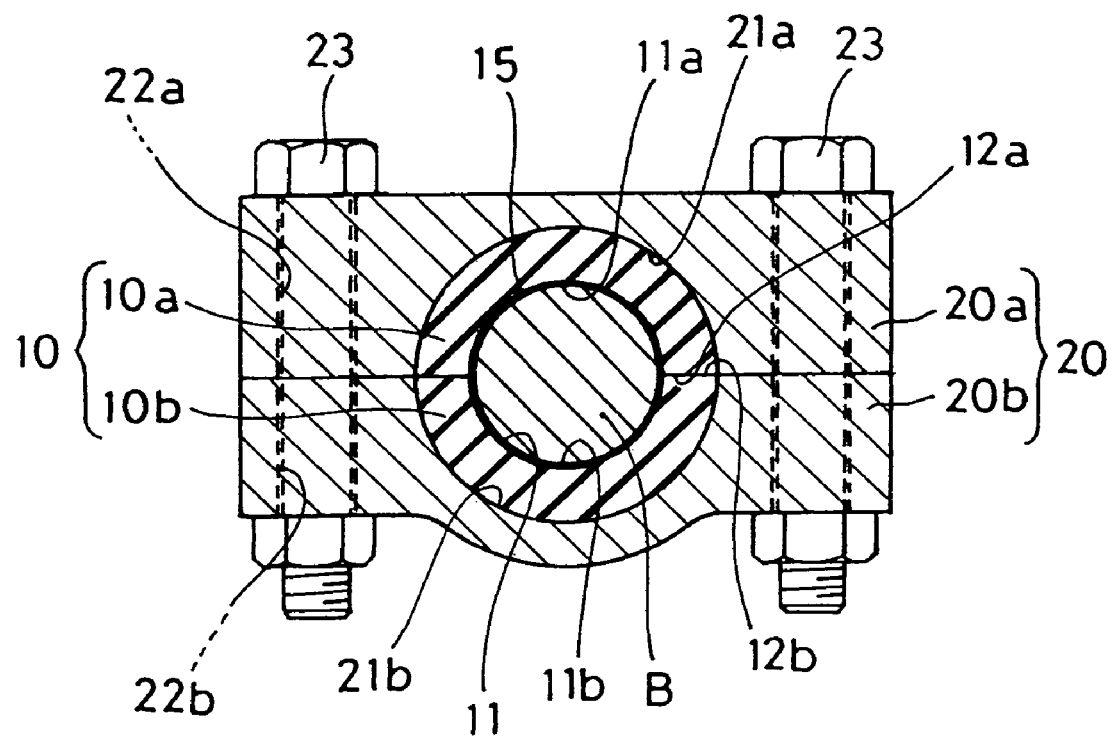
FIG. 5 is a sectional view of a bracket in the state that half members thereof are completely locked together.

FIG. 1 is a front elevation of a vibration isolator of this invention showing a separated state prior to its attachment to a bar member; FIG. 2 is a longitudinal sectional view of FIG. 1; FIG. 3 is a sectional view of the vibration isolator in FIG. 1 upon adhering to the bar member; FIG. 4 is a side elevational view in partial cross-section of the vibration isolator in FIG. 3 in the adhered state; and FIG. 5 is a sectional view similar to FIG. 3, but showing the state that half bracket members are completely locked together.

The illustrated example shows a case of the vibration isolator A used as a stabilizer bushing. The vibration isolator A includes a bushing main body 10 made of rubber elastomer assuming a thick-walled cylinder shape and having a bore 11 through which a bar member B as a stabilizer bar passes, and a bracket 20 holding the bushing main body 10 from outwardly thereof and made of metal material such as aluminum.

The bracket 20 and the bushing main body 10 are longitudinally split into two, respectively. The bracket 20 consists of half members 20a, 20b which are one pair of upper and lower split bodies formed in a manner such that a circular inner peripheral face of the bracket contacting with the bushing main body 10 is split so as to be longitudinally bisect. Usually the one half member is formed as an attachment side to the vehicle body whereas the other half member is formed as a locking side to the one half member. Both half members 20a, 20b are formed in corresponding places on both lateral sides thereof with locking holes 22a, 22b so that they can be locked by locking means such as a bolt 23. It is also possible to utilize another locking means other than the bolt so as to be capable of locking them.

The bushing main body 10 consists of one pair of split rubber bodies 10a, 10b split and formed so as to longitudinally bisect the bore 11 in conformity with the half members 20a, 20b of the bracket 20. Both split rubber bodies 10a, 10b are provided so that simultaneously with respective vulcanization molding, they may be vulcanization bonded respectively to semicircular inner peripheral surfaces 21a, 21b of the half members 20a, 20b, and split edge surfaces 12a, 12b of the split rubber bodies 10a, 10b may butt contact with each other by locking of both half members 20a, 20b.

And an inside diameter D1 of the bore 11 as molded (a dot-dash line in FIG. 3) defined by the split rubber bodies 10a, 10b is made somewhat smaller than an outside diameter D2 of the bar member B to be attached so that both the split rubber bodies 10a, 10b pinching the bar member B between them may be urged from outwardly and compressed by locking of both half members 20a, 20b of the bracket 20, whereby the peripheral surfaces 11a, 11b around the bore of both split rubber bodies 10a, 10b are enlarged in diameter, thus being made into contact bonding to the outer peripheral surface of the bar member B through an adhesive layer 15 while retaining a given contact pressure and ultimately both split rubber bodies are adhered and anchored to the bar member.

The inside diameter D1 of the bore 11 as molded is usually made to be smaller than the outside diameter D2 of the bar member B in a maximum diameter area of the bore 11 at least by a dimensional amount corresponding to a fastening allowance required for ensuring the contact pressure upon adhering, for example, about 1 to 30% the outside diameter D2.

Furthermore, the both split rubber bodies 10a, 10b are formed, with split edge surfaces 12a, 12b thereof as molded slanted more on their bore 11 sides in a manner protruding on mutually opposite sides and with semicircular peripheral surfaces 11a, 11b around the bore 11 being eccentric on mutually opposite sides relative to the semicircular inner peripheral surfaces 21a, 21b of the half members 20a, 20b, and thereby, the split rubber bodies 10a, 10b are somewhat thicker in wall thickness in their respective circumferentially central parts by an amount corresponding to the eccentricity amount. By being formed in this manner, the both split rubber bodies 10a, 10b are urged and compressed from outwardly, with the half members 20a, 20b of the bracket 20 pinching the bar member B locked together, whereby the split edge surfaces 12a, 12b butt contact with each other and simultaneously, the peripheral surfaces 11a, 11b of the bore are enlarged in diameter in a manner extending along the outer peripheral surface of the bar member B to be adhered to the outer peripheral surface of the bar member B. Further subsequently to the adhesion, both half members 20a, 20b are thoroughly locked so as to butt contact with each other, whereby the thick-walled circumferentially central parts of the split rubber bodies 10a, 10b are further compressed, and accordingly, the compression amount of the split rubber bodies 10a, 10b in mutually opposing directions is increased more than other parts by the thick-walled amount.

When assembling the vibration isolator A with the bar member B by adhering, the adhesive layer 15 is formed by coating an adhesive agent on either the outer peripheral surface of a predetermined place of the bar member B, to which a coating for sheathing is, for example, applied, or the peripheral surfaces 11a, 11b around the bore of the split rubber bodies 10a, 10b. For the adhesive, a chlorinated rubber adhesive or a polyolefine adhesive is used satisfactorily.

In installing the vibration isolator A thus constructed above to the bar member B by adhering, the following method is adopted:

Beforehand, the outer peripheral surface of the bar member B or the peripheral surfaces 11a, 11b around the bore of the split rubber bodies 10a, 10b are coated with an adhesive as described above. Both the split rubber bodies 10a, 10b of the bushing main body 10 are faced each other while pinching the bar member B through the intermediary of the adhesive layer 15, and urged from outwardly by locking both the half members 20a, 20b, thus contact bonding the peripheral surfaces 11a, 11b around the bore to the outer peripheral surface of the bar member B.

In particular, at that time, while a spacer 30 of a thickness corresponding to the eccentricity amount of both the peripheral surfaces 11a, 11b around the bore is interposed between the opposing surfaces of the half members 20a, 20b as shown in FIGS. 3 and 4, both the half members 20a, 20b are locked by a locking means such as a bolt 23, etc. Thereby the split edge surfaces 12a, 12b of the split rubber bodies 10a, 10b are first brought into butt contact with each other on the bore sides thereof, concurrently with which the split rubber bodies are compressed so as to enlarge the diameter of the peripheral surfaces 11a, 11b around the bore, and the peripheral surfaces 11a, 11b around the bore are contact bonded to the outer peripheral surface of the bar member B under retention of a given contact pressure. For the locking of the both half members 20a, 20b for the adhesion purposes, bolts 23 as a locking means may be utilized as shown in dot-dash lines in FIG. 3 or otherwise another locking tool can also be employed.

After the adhering, the spacer 30 is removed, and both half members 20a, 20b are completely locked so as to butt contact with each other, thereby faying the split edge surfaces 12a, 12b of the split rubber bodies together and simultaneously, further compressing the split rubber bodies 10a, 10b in mutually opposing directions (the vertical direction in FIG. 3). Thereby the fastening allowance of the split rubber bodies 10a, 10b in the opposing directions becomes large and the compression amount is increased, as a result of which even though the compression amount upon adhesion, which generates a high temperature heat, is small, after the adhesion a large compression amount can be imparted in the opposing directions, a preset spring constant can be retained, and the durability can be enhanced.

Due to the fact that the bushing main body 10 of rubber elastomer is adhered to the bar member B in this way, upon adhering, a necessary contact pressure for the adhesion can be ensured and accordingly, a reliable adhering and anchoring can be achieved and simultaneously, a predetermined compression amount can be imparted to the bushing main body 10. In particular, where the split rubber bodies 10a, 10b are constituted so that the compression amount in the opposing directions may be increased as is the example shown in FIGS. 1 through 5, their anchoring state is further stabilized and durability is also enhanced.

Figure 6:
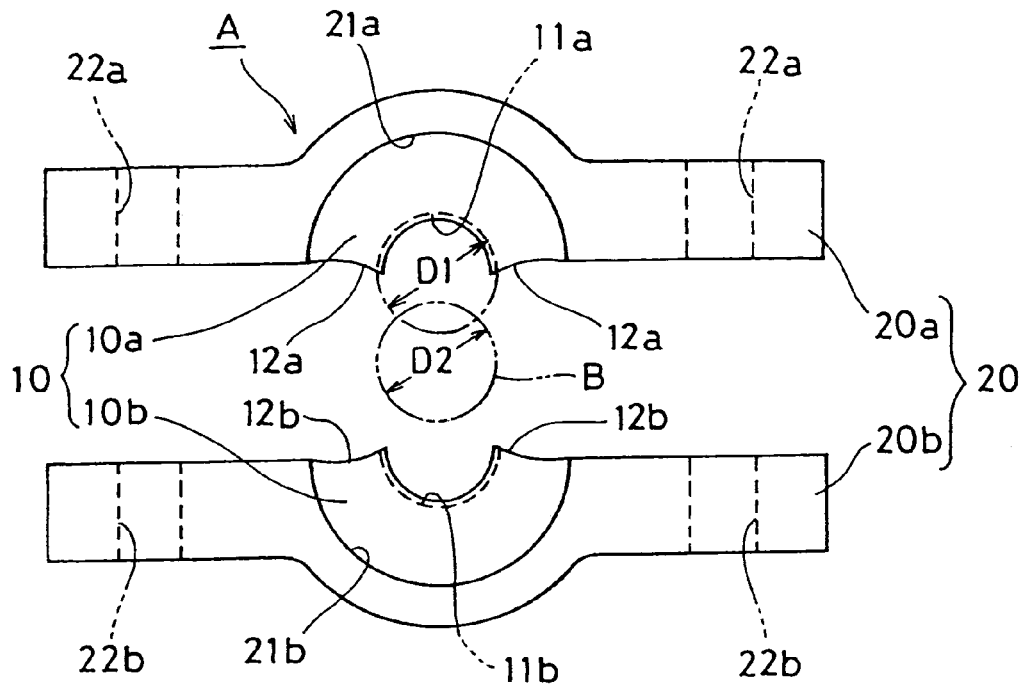
FIG. 6 is a front elevational view of a vibration isolator in another example showing its separated state prior to attachment to a bar member.
Figure 7:
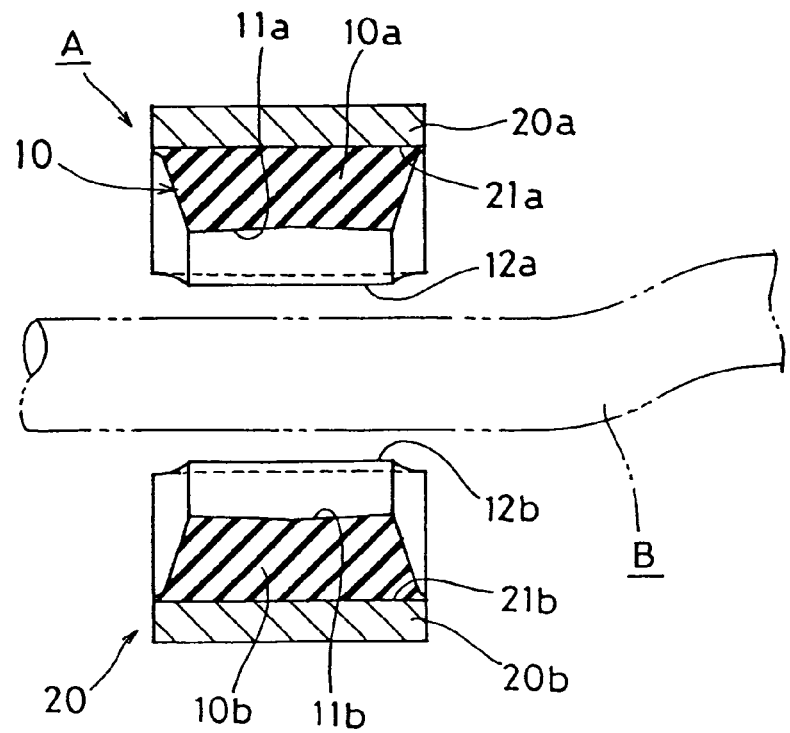
FIG. 7 is a longitudinal sectional view of FIG. 6.
Figure 8:
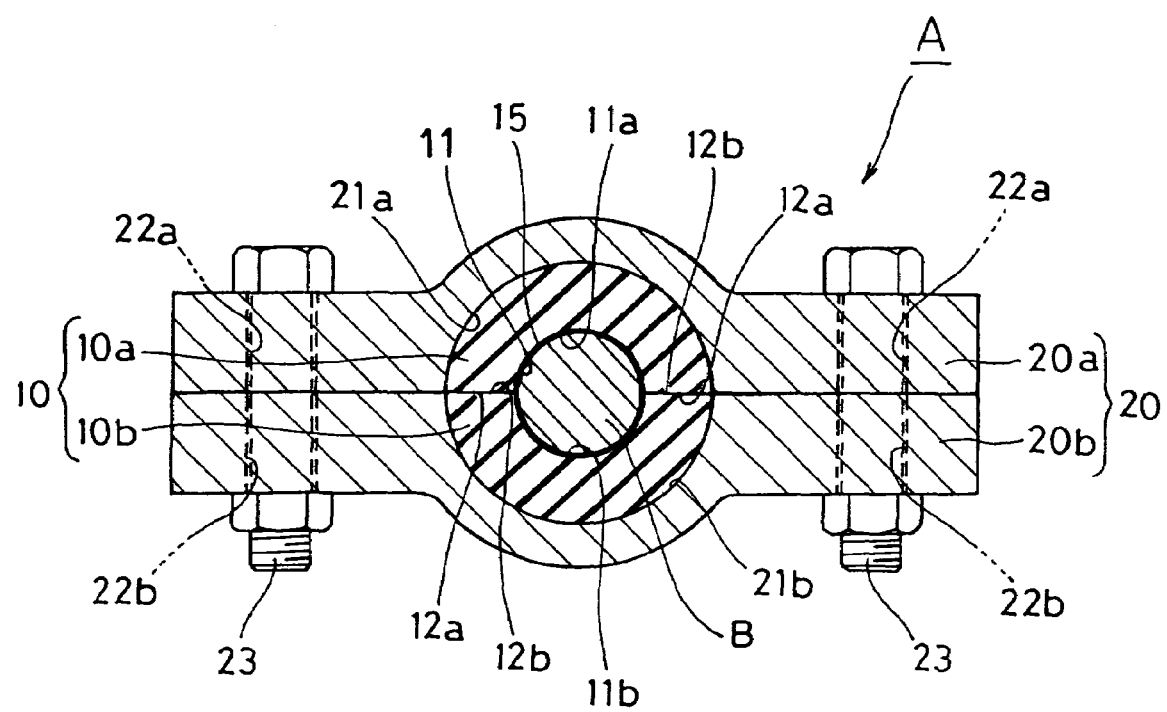
FIG. 8 is a longitudinal sectional view of the vibration isolator in FIG. 6 showing its attachment state to the bar member.

FIGS. 6 through 8 show a case of the vibration isolator mounted on the bar member B of a somewhat smaller diameter, and its construction is basically similar to the example described above. Like elements and locations of the similar construction are designated by like reference characters, and accordingly, detailed description of them is omitted.

In this example, the semicircular peripheral surfaces 11a, 11b around the bore of the both split rubber bodies 10a, 10b constituting the bushing main body 10, which are vertically split and formed so as to bisect the bore 11 of the bushing main body 10, are molded to be gradually smaller in diameter from the axially central part toward both ends so as to assume a slightly tapered form or a curved form of a slight radius of curvature in longitudinal cross-section. Thereby the axially both ends of the bushing main body where the contact pressure is liable to be lowered can also be compressed relative to the bar member B so as to generate a sufficient contact pressure, so that a good adhesion effect can be retained.

Also in this example, the inside diameter D1 of the bore 11 as molded is made smaller than the outside diameter D2 of the bar member B in the axially central part of the bore 11 of a maximum diameter at least by a dimensional amount corresponding to the fastening allowance required for ensuring the contact pressure upon adhering.

The constitution that the axially both ends of the peripheral surfaces 11a, 11b at the bore are made smaller in diameter is also applicable to the example in FIGS. 1 through 5 described above.

INDUSTRIAL APPLICABILITY

This invention can be satisfactorily utilized in cases where it is used as an automotive stabilizer bar bushing, rear suspension bushing or any other rubber bushings by its adhering and anchoring to a bar member.

DESCRIPTION OF REFERENCE CHARACTERS

A . . . vibration isolator, B . . . bar member, D1 . . . inside diameter of bushing main body as molded, D2 . . . outside diameter of the bar member, 10 . . . bushing main body, 10a, 10b . . . split rubber body, 11 . . . bore, 11a, 11b . . . peripheral surface around the bore, 12a, 12b . . . split edge surface, 15 . . . adhesive layer, 20 . . . bracket, 20a, 20b . . . half member, 21a, 21b . . . inner peripheral surface of the half member, 22a, 22b . . . locking hole, 23 . . . bolt, 30 . . . spacer

The invention claimed is:

1. A vibration isolator comprising a cylindrical bushing main body made of rubber elastomer having a bore through which a bar member passes, and a bracket holding the bushing main body from its outer periphery;

and adhesive bonded at said bore to said bar member, which is characterized in that said bushing main body and said bracket are longitudinally split into two, respectively, one pair of resulting split rubber bodies jointly constituting the bushing main body are vulcanization bonded to inner peripheral faces of one pair of resulting half bracket members capable of locking, an inside diameter of said bore as molded at both split rubber bodies is made smaller than an outside diameter of the bar member and semicircular peripheral surfaces around the bore of both split rubber bodies are formed to be eccentric on mutually opposite sides thereof;

both half bracket members are locked together while pinching the bar member by the both split rubber bodies, whereby the both split rubber bodies are compressed so as to enlarge respective inside diameters thereof and said peripheral surfaces around the bore are adhered to an outer peripheral surface of the bar member, and the both split rubber bodies are further compressed in mutually opposing directions by locking of the both half bracket members in a butt contacting state.

2. The vibration isolator as set forth in claim 1, characterized in that the inside diameter of the bore as molded at the both split rubber bodies is formed to be smaller than the outside diameter of the bar member at a maximum diameter portion thereof at least by a dimension corresponding to a fastening allowance required for ensuring a contact pressure upon adhering.

3. The vibration isolator as set forth in claim 2, characterized in that the both rubber bodies jointly constituting the bushing main body are molded so that peripheral surfaces around the bore thereof are gradually smaller in diameter from an axially central part toward both ends of them.

4. Attachment method of the vibration isolator as set forth in claim 2 comprising adhering the vibration isolator to the bar member, which method is characterized in that in adhering the peripheral surfaces around the bore of the split rubber bodies to the outer peripheral surface of the bar member, by locking the both half bracket members together in the state that the bar member is pinched through an adhesive layer by and between both split rubber bodies of the bushing main body, a spacer is interposed between opposing surfaces of the both half bracket members to compress the split rubber bodies so as to enlarge the inside diameter of the bore, thus adhering the peripheral surfaces around the bore to the outer peripheral surface of the bar member; and subsequently to the adhesion, the spacer is removed and both the half bracket members are locked together so as to butt contact with each other, thereby compressing further both split rubber bodies in mutually opposing directions.

5. The attachment method of the vibration isolator as set forth in claim 4, wherein split edge surfaces of the both split rubber bodies are slanted so as to protrude more on their bore sides toward the mutually opposite sides, and the both half bracket members are locked thereby to butt contact with each other.

6. The vibration isolator as set forth in claim 1,
characterized in that the both rubber bodies jointly constituting the bushing main body are molded so that peripheral surfaces around the bore thereof are gradually smaller in diameter from an axially central part toward both ends of them.

7. Attachment method of the vibration isolator as set forth in claim 6 comprising adhering the vibration isolator to the bar member, which method is characterized in that in adhering the peripheral surfaces around the bore of the split rubber bodies to the outer peripheral surface of the bar member, by locking the both half bracket members together in the state that the bar member is pinched through an adhesive layer by and between both split rubber bodies of the bushing main body, a spacer is interposed between opposing surfaces of the both half bracket members to compress the split rubber bodies so as to enlarge the inside diameter of the bore, thus adhering the peripheral surfaces around the bore to the outer peripheral surface of the bar member;
and subsequently to the adhesion, the spacer is removed and both the half bracket members are locked together so as to butt contact with each other, thereby compressing further both split rubber bodies in mutually opposing directions.

8. The attachment method of the vibration isolator as set forth in claim 7, wherein split edge surfaces of the both split rubber bodies are slanted so as to protrude more on their bore sides toward the mutually opposite sides, and the both half bracket members are locked thereby to butt contact with each other.

9. Attachment method of the vibration isolator as set forth in claim 1 comprising adhering the vibration isolator to the bar member, which method is characterized in that in adhering the peripheral surfaces around the bore of the split rubber bodies to the outer peripheral surface of the bar member, by locking the both half bracket members together in the state that the bar member is pinched through an adhesive layer by and between both split rubber bodies of the bushing main body, a spacer is interposed between opposing surfaces of the both half bracket members to compress the split rubber bodies so as to enlarge the inside diameter of the bore, thus adhering the peripheral surfaces around the bore to the outer peripheral surface of the bar member;
and subsequently to the adhesion, the spacer is removed and both the half bracket members are locked together so as to butt contact with each other, thereby compressing further both split rubber bodies in mutually opposing directions.

10. The attachment method of the vibration isolator as set forth in claim 9, wherein split edge surfaces of the both split rubber bodies are slanted so as to protrude more on their bore sides toward the mutually opposite sides, and the both half bracket members are locked thereby to butt contact with each other.

11. The attachment method of the vibration isolator as set forth in claim 10, wherein the spacer has a thickness the same as or slightly smaller than an eccentricity amount of the peripheral surfaces around the bore of the split rubber bodies so that the split edge surfaces on the bore sides of both split rubber bodies may butt contact with each other in the state that the both half members of the bracket are locked together while interposing the spacer.

12. The attachment method of the vibration isolator as set forth in claim 9, wherein the spacer has a thickness the same as or slightly smaller than an eccentricity amount of the peripheral surfaces around the bore of the split rubber bodies so that split edge surfaces on the bore sides of both split rubber bodies may butt contact with each other in the state that the both half members of the bracket are locked together while interposing the spacer.

* * * * *